United States Patent Office 3,432,541
Patented Mar. 11, 1969

3,432,541
9,15-DIHYDROXYPROST-13-ENOIC ACID AND ESTER AND PREPARATION THEREOF
Jehan F. Bagli, Valois Gardens, Montreal, Quebec, and Tibor Bogri, Montreal, Quebec, Canada, assignors to American Home Products Corporation, New York, N.Y., a corporation of Delaware
No Drawing. Filed Sept. 8, 1965, Ser. No. 485,935
U.S. Cl. 260—468                4 Claims
Int. Cl. C07c 61/04, 61/32, 61/36

This invention is concerned with new and useful hypotensive and anti-hypertensive agents which are readily synthesized from easily available starting materials and which possess pharmacological activities of the characteristics stated to a very considerable degree. The invention is also concerned with a process by which these new chemical compounds may be prepared and with various new chemical compounds useful as intermediates in their preparation.

The naturally occurring compounds known as the prostaglandins have been isolated from various animal sources, such as from the prostate gland of sheep and from the seminal plasma of man and various animals. Such isolation from natural sources is described, for example, by Berström, Abstracts International Congress of Biochemistry, vol. 7, p. 559 (1964). These naturally occurring compounds are known to possess a variety of biological activities one of which is their ability to lower the blood pressure of animals. They also possess the ability to influence the tone of smooth muscles acting, for example, upon the human myometrium and upon the uterus of various animals. Among articles in the scientific literature dealing with the biological activities of the naturally occurring products isolated from animal or human sources, there may be mentioned the following: Goldblatt, Chem. & Ind., vol. 52, p. 1056 (1933); Von Euler, Arch. Exp. Path. Pharmacol. vol. 175, p. 78 (1934); Von Euler, Scand. Arch. Physiol. vol. 81, p. 65 (1939); Eliasson, Biochem. Pharm., vol. 12, p. 405 (1963); Bergström et al., Acta. Physiol. Scand., vol. 45, p. 133 (1959).

In view of the variety of biological activities exhibited by the prostaglandins, efforts have been made to elucidate the chemical structure of these compounds. They are now known to contain an oxygenated cyclopentane nucleus to which two side-chains are attached in vicinal positions. Two types of cyclopentane nuclei are known, which gives rise to two series of natural prostaglandins commonly designated as E and F. There are also two types of side chains, one of which contains a terminal carboxylic acid group and may also contain a double bond, and the other contains an hydroxyl group together with one or two double bonds. These side chains are present in the natural prostaglandins in three definite combinations which have been called 1, 2, and 3, depending upon the total number of double bonds present, so that the six natural prostaglandins known to date are designated as $E_1$, $E_2$, and $E_3$, and $F_1$, $F_2$, and $F_3$. The following formulae, in which the dotted line represents a valency bond in the α-configuration and the solid line a bond in the β-configuration, will show their specific structures.

The hypothetical completely saturated and unsubstituted parent compound of the natural prostaglandins is called prostanoic acid and may be represented by the following formula:

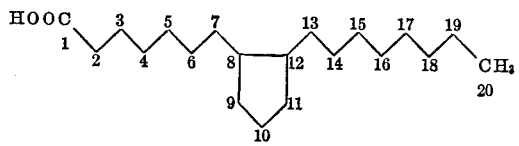

The nomenclature of the natural prostaglandins is derived from the above formula and numbering system. Thus, for example, the chemical name of prostaglandin $E_1$ is 11,15-dihydroxy-9-keto-prost-13-enoic acid.

Among the articles dealing with the chemical structure and the biological activities of these naturally occurring products there may be mentioned the review papers of B. Samuelsson in Angewandte Chemie, International Edition, vol. 4, p. 410 (May 1965) and of E. W. Horton in Experientia, vol. 21, p. 113 (Mar. 15, 1965).

While the naturally occurring prostaglandins are characterized by the biological activities previously mentioned, rendering them as of possible interest in medicine, these activities have been largely of theoretical importance in that only very small amounts of these naturally occurring products could be isolated. Dependent, as they are, upon natural animal sources for these products it is evident that no real posibility of producing the compounds in substantial volume existed. Under such circumstances, while the ability of the prostaglandins to lower blood pressure was of course of interest to biochemists, and to others engaged in research in this field, the naturally occurring prostaglandins had, of course, no practical interest in view of the limited supplies thereof which could be secured.

Our interest has, therefore, centered on being able to synthesize from easily available starting materials compounds which would be related chemically to these prostaglandins and which might, therefore, be expected to possess, to a greater or lesser degree, the desired biological properties characterized in the naturally occurring compounds. We have succeeded in producing by synthesis, using starting materials which are commercially available in any desired amount, and without restriction, compounds which are chemically related in structure to certain of these prostaglandins which compounds are characterized by many of the desired biological properties possessed by the naturally occurring compounds themselves. Thus, certain of the chemical compounds which we have produced by synthesis are distinguished by outstanding hypotensive and anti-hypertensive activity such as to render them of medical interest for use in the treatment of animals and human patients who suffer with high blood pressure. In preparing the new chemical compounds with which this invention is concerned, we have found it desirable to use as starting materials compounds which are readily available commercially in any desired amounts.

In accordance with our synthesis for making readily

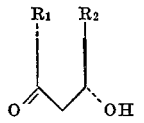 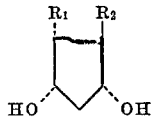

Nucleus of Prostaglandins E   Nucleus of Prostaglandins F

| Prostaglandins | $R_1$ | $R_2$ |
|---|---|---|
| $E_1$ and $F_1$ | —(CH$_2$)$_6$—COOH | —CH:CHCH(OH)(CH$_2$)$_4$CH$_3$ |
| $E_2$ and $F_2$ | —CH$_2$CH:CH(CH$_2$)$_3$COOH | —CH:CHCH(OH)(CH$_2$)$_4$CH$_3$ |
| $E_3$ and $F_3$ | —CH$_2$CH:CH(CH$_2$)$_3$COOH | —CH:CHCH(OH)CH$_2$CH:CHCH$_2$CH$_3$ | available compounds useful in the treatment of high blood pressure, such compounds being chemically related to the prostaglandins which are now available only in very restricted amounts from natural sources, the first step in our process involves the condensation of an ω-halogenated fatty acid lower alkyl ester with an alkali metal salt of a lower alkyl ester of cyclopentanone 2-carboxylic acid. The resulting cyclopentanone 2,2-diester is then halogenated to obtain the corresponding 5-halo derivative, and the latter compound is dehydrohalogenated, hydrolyzed, and decarboxylated to obtain a cyclopent-2-en-1-one containing the fatty acid substituent introduced in the first step in position 2. The latter compound is then treated with an agent suitable to introduce a cyano substituent in position 3 of the cyclopentanone nucleus, to obtain the corresponding ketonitrile, and the nitrile group of the latter compound is hydrolyzed by conventional means to convert it to a carboxylic acid group, thus obtaining a cyclopentanone diacid containing the fatty acid substituent mentioned above in position 2 and a carboxylic acid group in position 3. Partial esterification of the latter diacid with a lower alkanol in the presence of a suitable acid catalyst yields the corresponding monoester. The free carboxylic acid group attached directly to the cyclopentanone nucleus of the latter monoester is then converted to the corresponding acid halide which is reacted with acetylene in the presence of an acid catalyst to obtain the corresponding halovinyl ketone. The latter halovinyl ketone is then reacted with a lower alkanol in the presence of a basic catalyst, thus converting the halovinyl side chain to the acetal of the corresponding aldehyde. The two keto groups present in the latter acetal are then reduced to obtain the corresponding diol, and treatment of that latter diol with an aqueous mineral acid hydrolyzes the acetal group and dehydrates in the side chain at the same time, to yield the corresponding α,β-unsaturated aldehyde. Reaction of that latter α,β-unsaturated aldehyde with a Grignard reagent prepared from a lower alkyl halide yields a mixture from which the lower alkyl ester of the corresponding cyclopentanol-2-(fatty acid) carrying a 3-hydroxyalk-2-enyl group in position 3 of the cyclopentanol nucleus may be isolated. Alkaline hydrolysis of the latter lower alkyl ester then yields the corresponding free acid, which may be regarded as a derivative of a natural prostaglandin.

Our invention will be described more specifically below, and the Roman numerals appearing in the text refer to the formulae in the accompanying flow-sheet.

In preparing our new deriative of the natural prostaglandin $F_1$ and the various intermediates resulting in our process, we prefer to use as starting maetrials for our synthesis ethyl 7-bromo-1-heptanoate (I) which may in turn be prepared from other starting materials according to the process of Ames et al. reported in J. Chem. Soc., 1950, p. 174, and the potassium salt of ethyl cyclopentanone carboxylate (II) which may be obtained according to the method described by R. Mayer in "Newer Methods of Organic Chemistry," Academic Press, New York and London, 1963, vol. 2, p. 122. Refluxing of a mixture of the above two compounds in an inert solvent yields the diester ethyl 2-(6-carbethoxyhexyl)-cyclopentan-1-one-2-carboxylate (III).

The latter compound is brominated with elementary bromine in chloroform solution to yield the monobromide ethyl 2-(6-carbethoxyhexyl)-5-bromocyclopentan-1 - one-2-carboxylate (IV) which, upon treatment with a mineral acid, such as, for example, 20 percent sulfuric acid, yields the unsaturated ketone 2-(6-carboxyhexyl)-6 - cyclopent-2-en-1-one (V). The unsaturated ketone V is treated with acetone cyanohydrin in the presence of an alkali metal carbonate and of a lower alkanol, preferably in the presence of sodium carbonate and methanol, to yield the nitrile 2-(6-carboxyhexyl)-3-cyano-cyclopentan-1-one (VI). The latter nitrile VI is readily hydrolyzed with an alkali metal hydroxide, preferably sodium hydroxide, to yield the diacid 2-(6-carboxyhexyl)-3-carboxyl-cyclopentan - 1 - one (VII). The latter diacid VII is converted to its monomethyl ester, 2-(6 - carbomethoxyhexyl) - 3 - carboxyl-cyclopentan-1-one (VIII) under carefully controlled conditions, preferably by treatment with methanol and p-toluenesulfonic acid. The monomethyl ester VIII obtained as above is converted to the corresponding acid chloride (IX) by treatment with an acid chloride such as oxalyl chloride, phosphorus pentachloride or thionyl chloride, preferably by treating it with thionyl chloride in dry benzene, and the latter acid chloride IX is condensed directly, without purification, with acetylene in the presence of a Lewis acid, preferably aluminum chloride under the conditions of the Friedel-Crafts reaction to obtain the chlorovinyl ketone 2-(6-carbomethoxyhexyl)-3-(3-chloro-1-oxoprop-2-enyl)cyclopentan-1-one (X). The latter chlorovinyl ketone X, upon treatment with an alkali metal hydroxide in solution in a lower alkanol, preferably sodium hydroxide in methanol, yields the acetal 2 - (6 - carbomethoxyhexyl)-3-(3,3-dimethoxy-1 - oxopropyl) - cyclopentan-1-one (XI).

The above acetal XI is reduced with a metal borohydride, preferably sodium borohydride in methanol, to yield the corresponding diol 2-(6-carbomethoxyhexyl)-3-(3,3-dimethoxy-1-hydroxypropyl)-cyclopentan-1-ol (XII). The acetal group of the latter diol XII is then converted to the corresponding aldehyde group, preferably by treatment with an aqueous acid, such as, for example 2 N sulfuric acid or p-toluenesulfonic acid, to yield the α,β-unsaturated aldehyde 2-(6-carbomethoxyhexyl)-3-(3 - oxoprop-2-enyl)-cyclopentan-1-ol (XIII). Reaction of the latter α,β-unsaturated aldehyde with pentyl magnesium bromide under the conditions of the Grignard reaction yields a mixture from which the monomethyl ester methyl 9ξ,15ξ-dihydroxyprost-13-en-1-oate (XIV) is isolated. Alkaline hydrolysis of the latter compound XIV yields the free acid 9ξ,15ξ-dihydroxyprost-13-enoic acid (XV) which may also be called 11-desoxyprostaglandin $F_1$. The letter ξ in the names of Compounds XIV and XV denotes undefined configurations in positions 9 and 15.

It should be noted that the synthesis, as described, results in two new compounds, designated as XIV and XV in the flow-sheet, which are characterized by hypotensive and antihypertensive activities of a very considerable degree. These compounds are useful in medicine for these purposes. They may, for example, be administered intravenously in dosages containing from 0.1 mg. to 10 mg. of the active chemical compound in accordance with the usual regimen used in the treatment of hypertensive patients to control and maintain blood pressure within a desired range of levels. Therapeutically useful formulations for intravenous injection in accordance with this procedure may contain, for example, from 0.01% to 1% of either methyl 9ξ,15ξ-dihydroxyprost-13 - en - 1 - oate (XIV) or 9,15-dihydroxyprost-13-enoic acid (XV), dispersed in a suitable vehicle. In preparing these formulations, the usual aqueous vehicles can be utilized and some solubilizing agent such as, for example, a polyxyalkylene derivative of sorbitan monooleate ("Tween 80") may be used to bring the compound into solution therein.

While the biological properties of compounds III to XIII have not been fully evaluated, it has been observed that at least some of these possess biological properties of their own not necessarily related to biological activities of prostaglandins. Thus, for example the diacid 2-(6-carboxyhexyl)-3-carboxyl-cyclopentan-1-one (VII) has antibacterial and trichomonicidal properties. As an antibacterial agent it is active against a variety of gram-positive and gram-negative organisms, such as *Staphylococcus pyogenes* (both penicillin-sensitive and penicillin-resistant strains), *Sarcina lutea, Staphylococcus faecalis, Escherichia coli, Aerobacter aeruginosa, Salmonella pullorum, Pseudomonas aeruginosa, Proteus mirabilis, Proteus vulgaris*. For use as an antibacterial agent the compound may be formulated in aqueous vehicles containing from 0.1 to 1.0 percent of the active ingredient; it may also be formulated in the forms of lotions or creams containing the same amounts of active ingredient as above, such formulations may be applied typically to the site of infection as required.

The following formulae and examples will illustrate our invention:

EXAMPLE 2

Ethyl 2-(6-carbethoxyhexyl)-5-bromo-cyclopentan-1-one-2-carboxylate (IV)

To a stirred solution of the diester III, (105.6) as obtained in Example I, in chloroform (300 ml.), bromine (53.0 g.) in chloroform (200 ml.) is added at 0° C. over

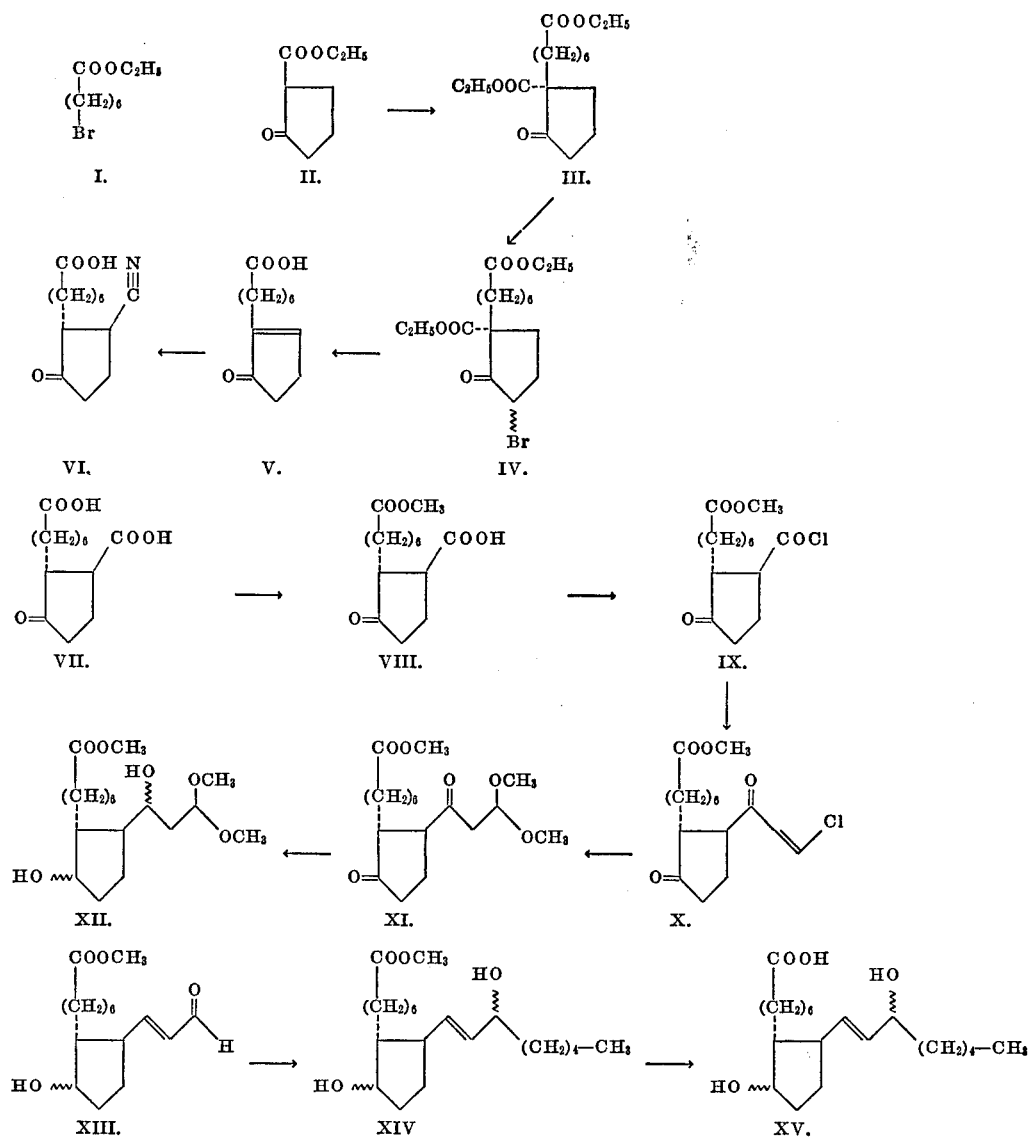

EXAMPLE 1

Ethyl 2-(6-carbethoxyhexyl)-cyclopentan-1-one-2-carboxylate (III)

To a suspension of the potassium salt of cyclopentanone ethyl carboxylate (I, 31.04 g.) in dry toluene (160 ml.), ethyl bromoheptanoate (II, 37.92 g.) is added. The mixture is refluxed overnight, cooled and acidified with 10% $H_2SO_4$ (120 ml.). The aqueous layer is separated, saturated with sodium chloride, and extracted several times with ether. The organic extracts are washed with sodium bicarbonate and water, dried, and the solvent is evaporated. The residue is distilled to yield the diester III, B.P. 146–148° C./0.07–0.05 mm., $n_D^{22}$ 1.4557, $\nu_{max}$ 1718, 1740 cm.$^{-1}$.

a period of one hour. The solvent is evaporated to yield the crude title compound (IV). This material is used directly for the preparation of the cyclopentenone V. For analysis, a sample may be distilled at 170–180° C. bath temperature and at a pressure of 0.05–0.03 mm. Analysis confirmed the above structure.

EXAMPLE 3

2-(6-carboxyhexyl)-cyclopent-2-en-1-one (V)

The bromoketo diester IV, obtained as in Example 2 (135 g.), and 20% sulphuric acid (1000 ml.) are refluxed for 48 hours, and the reaction mixture is saturated with sodium chloride and extracted with ether. The ether is extracted with 5% sodium hydroxide which, after acidification with 10% sulphuric acid, is re-extracted with ether, dried over magnesium sulphate and evaporated to dryness. The residue is chromatographed on silicic acid (1 kg.), using 1% methanol in chloroform as eluent. The crystalline fractions are combined to yield the compound V in the pure state, $\lambda_{max.}$ 228 m$\mu$, $\epsilon$ 10,000.

EXAMPLE 4

2-(6-carboxyhexyl)-3-cyano-cyclopentan-1-one (VI)

A mixture of the cyclopentenone V (15 g.), methanol (162 ml.), water (120 ml.), and sodium carbonate (6.1 g.), and acetone cyanohydrin (15 g.) is refluxed for 4 hours, then evaporated to half of its volume. The residue is acidified with 5% hydrochloric acid, saturated with sodium chloride and extracted with ether. The ether extract is washed with water, dried over magnesium sulphate and the solvent evaporated. The crude title compound VI thus obtained may be used directly for the preparation of the ketoacid VII.

EXAMPLE 5

2 - (6-carboxyhexyl)-3-carboxyl-cyclopentan-1-one (VII)

A solution of the ketonitrile obtained as in Example 4 (17.3 g.) in 8% sodium hydroxide (1000 ml.) is refluxed for two hours. The solution is cooled, acidified with concentrated hydrochloric acid and extracted with chloroform. The chloroform is dried over magnesium sulphate, the solvent evaporated and the residue chromatographed on silicic acid (500 g.). Elution with chloroform containing 1% methanol yields the title compound as a homogeneous crystalline material which is recrystallized from benzene to M.P. 73–74.5° C.

EXAMPLE 6

2-(6-carbomethoxyhexyl)-3-carboxyl-cyclopentan-1-one (VIII)

The diacid VII obtained as in Example 5 (8.9 g.) is dissolved in methanol (445 ml.) and p-toluenesulfonic acid (8.9 g.) in methanol (445 ml.) is added. The mixture is allowed to stand at room temperature for 55 minutes, the pH is adjusted to 6.5 with alcoholic potassium hydroxide and the methanol evaporated in vacuo. The residue is dissolved in water, acidified to pH 2 with hydrochloric acid, saturated with sodium chloride, and extracted with ether. Evaporation of the solvent yields a crude produce which is crystallized from a 1:1 mixture of ether and petroleum ether to yield the title compound VIII with M.P. 58–60° C.

EXAMPLE 7

2-(6-carbomethoxyhexyl)-3-(3-chloro-1-oxo-prop-2-enyl)-cyclopentan-1-one (X)

The monoester VIII obtained as in Example 6 (3 g.) is dissolved in benzene (90 ml.), thionyl chloride (30 ml.), is added and the mixture is refluxed for 1.5 hours. After evaporation to dryness in vacuo, the residue shows the typical infrared absorption spectrum of a carboxylic acid chloride. It is dissolved in carbon tetrachloride (75 ml.) and added to a suspension of aluminum chloride (6 g.) in carbon tetrachloride (75 ml.) previously saturated with acetylene. During the addition over a period of time of ten minutes acetylene gas is passed through the suspension, and passage of acetylene is continued for 2.5 hours after the addition has been completed. The mixture is stirred overnight at room temperature, ice is added and the aqueous layer is extracted with carbon tetrachloride. The combined organic extract is washed with water, dried over anhydrous magnesium sulfate, and evaporated to dryness to give a crude product. It is chromatographed on silica gel, and elution with chloroform affords the pure title compound X, which shows infrared absorption bands at 1730 and 1580 cm.$^{-1}$ and a characteristic absorption band in the U.V. at 235 m$\mu$.

EXAMPLE 8

2-(6-carbomethoxyhexyl)-3-(3,3-dimethoxy-1-oxopropyl)-cyclopentan-1-one (XI)

To a solution of 2-(6-carbomethoxyhexyl)-3-(3-chloro-1-oxo-prop-2-enyl)-cyclopentan-1-one (X), obtained as in Example 7, (1.14 g.) in methanol (100 ml.) is added 1.5 ml. anhydrous methanolic sodium hydroxide (conc. 150 mg./ml.) and the mixture is evaporated to 40 ml. over a period of time of 30 minutes at room temperature. Ice is added, the mixture is extracted with ether, the ether washed with water, dried over anhydrous magnesium sulfate and the solvent removed in vacuo to yield the compound XI, a diketoacetal which is characterized by an infrared absorption band at 1730 cm.$^{-1}$ with a shoulder at 1710 cm.$^{-1}$.

EXAMPLE 9

2-(6-carbomethoxyhexyl)-3-(3,3-dimethoxy-1-hydroxypropyl)-cyclopentan-1-ol (XII)

To a solution of the diketoacetal XI as obtained in Example 8 (1.1 g.) in methanol (100 ml.), sodium borohydride (1.1 g.) is added over a period of 20 minutes. The mixture is stirred at room temperature for 40 minutes. The methanol is removed in vacuo, ice is added to the residue, and the mixture is extracted with chloroform. After drying over anhydrous magnesium sulfate evaporation of the solvent gives the crude product of reduction which is chromatographed on silica gel. The pure compound is eluted with 2% methanol in chloroform and crystallized from ether-petroleum ether to yield the title compound XII, a dihydroxyacetal characterized by infrared adsorption bands at 3400 and 1730 cm.$^{-1}$.

EXAMPLE 10

2-(6-carbomethoxyhexyl)-3-(3-oxoprop-2-enyl)-cyclopentan-1-ol (XIII)

The oily dihydroxyacetal XII obtained as in Example 9 (480 mg.), methanol (20 ml.) and 2 N sulfuric acid are refluxed for five hours. The methanol is evaporated at room temperature, the residue saturated with sodium chloride and extracted with ether. The ether layer is washed with water, dried over anhydrous magnesium sulfate, and the solvent evaporated. The residue is purified by chromatography using silica gel adsorbent and chloroform as eluant to obtain the pure title compound XIII, an $\alpha,\beta$-unsaturated aldehyde characterized by $\nu_{max.}$ 3600, 3450, 1730, 1680, 1630 cm.$^{-1}$ and $\lambda_{max.}$ 228 m$\mu$.

EXAMPLE 11

Methyl 9$\xi$,15$\xi$-dihydroxyprost-13-en-1-oate (XIV)

To a solution of the $\alpha,\beta$-unsaturated aldehyde XIII obtained as in Example 10 (150 mg.) in ether (10 ml.), pentane magnesium bromide (1.2 ml. of a molar solution in ether) is added, the mixture is stirred at room temperature for six hours and then refluxed for fifteen minutes. The complex is decomposed with saturated ammonium chloride solution, extracted with ether, the ether layer washed with water and dried over anhydrous magnesium sulfate. Evaporation of the solvent gives the crude reaction product which is chromatographed on silica gel. Elution with 1% methanol in chloroform yields the title compound XIV characteristized by $\nu_{max.}$ 3600, 3420, 1725 cm.$^{-1}$.

EXAMPLE 12

9$\xi$,15$\xi$-dihydroxyprost-13-enoic acid (XV)

Methyl 9$\xi$,15$\xi$-dihydroxyprost-13-en-1-oate XIV, obtained as in Example 11 (22.3 mg.) is hydrolyzed in methanol (2 ml.) with 2 N aqueous sodium hydroxide (10 drops) by refluxing for 30 minutes. The mixture is evaporated to dryness at room temperature, the residue dissolved in water, acidified with 5% hydrochloric acid, saturated with sodium chloride and extracted with ether.

The ether layer is washed with water, dried over anhydrous magnesium sulfate and evaporated to yield the title compound XV characterized by $\nu_{max}$ 1710 cm.$^{-1}$.

We claim:
1. 9ξ,15ξ-dihydroxyprost-13-enoic acid.
2. Methyl 9ξ,15ξ-dihydroxyprost-13-en-1-oate.
3. The process which comprises condensing an ω-halogenated fatty acid lower alkyl ester with an alkali metal salt of a lower alkyl ester of cyclopentanone-2-carboxylic acid; halogenating the resulting cyclopentanone 2,2-diester, thereby obtaining the corresponding 5-halo derivative; dehydrohalogenating, hydrolyzing and decarboxylating said last-named compound, thereby obtaining a cyclopent-2-en-1-one containing, in the 2-position, said fatty acid substituent previously introduced; treating said last-named compound with an agent serving to introduce a cyano substituent in position-3 of the cyclopentanone nucleus, thereby obtaining the corresponding ketonitrile; hydrolyzing said nitrile group of said ketonitrile to a carboxylic acid group by treatment thereof with a hydrolyzing agent, thereby obtaining a cyclopentanone diacid containing said fatty acid substituent in position-2 and a carboxylic acid group in position-3; treating said diacid with a lower alkanol in the presence of an acid catalyst, thereby effecting partial esterification, and securing the corresponding monoester; converting said free carboxylic acid group attached directly to the cyclopentanone nucleus of said monoester to the corresponding acid halide by treatment thereof with an acid halide, and reacting said resulting corresponding acid halide with acetylene in the presence of an acid catalyst thereby obtaining the corresponding halovinyl ketone; reacting said halovinyl ketone with a lower alkanol in the presence of a basic catalyst, thus converting the halovinyl side chain thereof to the acetal of the corresponding aldehyde; reducing the two keto groups present in said acetal, thereby securing the corresponding diol; treating said last-named diol with an aqueous mineral acid, thereby hydrolyzing said acetal group and effecting dehydration in the side chain simultaneously, thereby securing the corresponding α,β-unsaturated aldehyde; reacting said α,β-unsaturated aldehyde with a Grignard reagent prepared from a lower alkyl halide, thereby securing a reaction mixture, and isolating from said reaction mixture the lower alkyl ester of the corresponding cyclopentanol-2-(fatty acid) having a 3-hydroxyalk-2-enyl group in position-3 of the cyclopentanol nucleus; and subjecting said last named compound to alkaline hydrolysis, thereby securing the corresponding free acid.

4. The process which comprises refluxing ethyl 7-bromo-1-heptanoate and the potassium salt of ethyl cyclopentanone carboxylate in an inert solvent, thereby obtaining ethyl 2-(6-carbethoxyhexyl)-cyclopentan-1-one-2-carboxylate; brominating said last-named diester by treatment thereof with bromine in chloroform solution, thereby securing ethyl 2-(6-carbethoxyhexyl)-5-bromo-cyclopentan-1-one-2-carboxylate; treating said last-named monobromide with a mineral acid, thereby obtaining 2-(6-carboxyhexyl)-cyclopent-2-en-1-one; treating said last-named unsaturated ketone with acetone cyanohydrin in the presence of an alkali metal carbonate and a lower alkanol, thereby securing 2-(6-carboxyhexyl)3-cyano-cyclopentan-1-one; hydrolyzing said last-named nitrile by treatment thereof with an alkali metal hydroxide, thereby securing 2-(6-carboxyhexyl)-3-carboxyl-cyclopentan-1-one; converting said last-named diacid to its monomethyl ester by treatment thereof with methanol and p-toluenesulfonic acid, thereby obtaining 2-(6-carbomethoxyhexyl)-3-carboxyl-cyclopentan-1-one; converting said last-named monomethyl ester to the corresponding acid chloride by treatment thereof with an acid chloride in an inert solvent, and condensing said acid chloride of said monomethyl ester directly, without purification, with acetylene in the presence of a Lewis acid under the conditions of the Friedel-Crafts reaction, thereby obtaining 2-(6-carbomethoxyhexyl)-3-(3-chloro-1-oxo-prop-2-enyl)cyclopentan-1-one; treating said last-named chlorovinyl ketone with an alkali metal hydroxide in solution in a lower alkanol, thereby securing 2-(6-carbomethoxyhexyl)-3-(3,3-dimethoxy-1-oxopropyl)-cyclopentan-1-one; reducing said last-named acetal by treatment thereof with a metal borohydride in methanol, thereby securing 2-(6-carbomethoxyhexyl)-3-(3,3-dimethoxy-1-hydropropyl)-cyclopentan-1-ol; converting the acetal group of said last-named diol compound to the corresponding aldehyde group by treatment thereof with an aqueous acid thereby securing the corresponding α,β-unsaturated aldehyde, 2-(6-carbomethoxyhexyl)-3-(3-oxoprop-2-enyl)-cyclopentan-1-one; reacting said last-named α,β-unsaturated aldehyde with pentyl magnesium bromide under the conditions of the Grignard reaction and recovering methyl 9ξ,15ξ-dihydroxyprost-13-en-1-oate from the resulting reaction mixture; and hydrolyzing said last-named monomethyl ester under alkaline conditions, thereby securing the free acid 9ξ,15ξ-dihydroxyprost-13-enoic acid.

References Cited

Horton, E. W.: Experientia, vol. 21, p. 113–4, Mar. 15, 1965.

Bergström, S.: Sixth International Congress of Biochem., Abstract VII (July 26–Aug. 1, 1964).

Bergström, S., et al.: Acta Physiol. Scand. 1964, 60. 170–180.

LORRAINE A. WEINBERGER, *Primary Examiner.*

P. J. KILLOS, *Assistant Examiner.*

U.S. Cl. X.R.

260—464, 514; 424—305, 317